US009812057B2

(12) United States Patent
Wiley

(10) Patent No.: US 9,812,057 B2
(45) Date of Patent: Nov. 7, 2017

(54) TERMINATION CIRCUIT TO REDUCE ATTENUATION OF SIGNAL BETWEEN SIGNAL PRODUCING CIRCUIT AND DISPLAY DEVICE

(71) Applicant: QUALCOMM Incorporated, San Diego, CA (US)

(72) Inventor: George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 14/818,675

(22) Filed: Aug. 5, 2015

(65) Prior Publication Data

US 2017/0039929 A1 Feb. 9, 2017

(51) Int. Cl.
*G09G 3/20* (2006.01)
*G09G 5/00* (2006.01)
(Continued)

(52) U.S. Cl.
CPC .............. *G09G 3/2092* (2013.01); *G09G 3/20* (2013.01); *G09G 5/008* (2013.01);
(Continued)

(58) Field of Classification Search
CPC ........ G06F 1/1601; G06F 1/16; G06F 3/0412; G06F 3/045; G06F 13/4072; G06F 13/00;
(Continued)

(56) References Cited

U.S. PATENT DOCUMENTS 5,311,081 A  5/1994  Donaldson et al.
6,218,854 B1 *  4/2001  Ko ....................... H03K 17/162
                                                       326/30
(Continued)

FOREIGN PATENT DOCUMENTS

GB       2471542 A      1/2011
KR    20140056615 A      5/2014

OTHER PUBLICATIONS

International Search Report and Written Opinion—PCT/US2016/042819—ISA/EPO—dated Oct. 12, 2016.
(Continued)

*Primary Examiner* — Dismery Mercedes
(74) *Attorney, Agent, or Firm* — Muncy, Geissler, Olds & Lowe

(57) ABSTRACT

A termination circuit can include an impedance component. A first port can be configured to be connected to a first node. The first node can be a node of a conductor of a cable. A first end of the cable can be configured to be connected to a signal producing circuit. A second end of the cable can be configured to be connected to a first end of a trace disposed on a substrate of a display device. A second end of the trace can be connected to a display driver integrated circuit (DDIC). The DDIC can lack a termination impedance component internal to the DDIC to provide a line termination function for a serial interface with the signal producing circuit. A second port can be configured to be connected to a second node. The impedance component can be connected between the first port and the second port.

30 Claims, 8 Drawing Sheets

(51) Int. Cl.
  *H04L 25/02* (2006.01)
  *G06F 13/40* (2006.01)
  *G06F 3/041* (2006.01)
  *H04L 25/03* (2006.01)

(52) U.S. Cl.
  CPC ........ *H04L 25/0278* (2013.01); *G06F 3/0412* (2013.01); *G06F 13/4072* (2013.01); *G09G 2300/043* (2013.01); *G09G 2300/0426* (2013.01); *G09G 2300/0809* (2013.01); *G09G 2310/08* (2013.01); *G09G 2320/0209* (2013.01); *G09G 2320/0223* (2013.01); *G09G 2370/00* (2013.01); *H04L 25/0274* (2013.01); *H04L 25/03* (2013.01)

(58) Field of Classification Search
  CPC .. G09G 3/3696; G09G 3/2092; G09G 3/2096; G09G 2310/08; G09G 2320/0693; G09G 2330/021; G09G 5/006; G09G 5/008; G09G 2300/0408; H03K 19/0005; H05K 1/0268; H05K 1/0216; H05K 5/0017; H01L 27/3288; H01L 23/5389; H04L 25/0272; H04L 25/0278; H04L 25/0292; H04L 25/026
  See application file for complete search history.

(56) References Cited

U.S. PATENT DOCUMENTS

| | | | |
|---|---|---|---|
| 6,836,149 B2 | 12/2004 | Chow | |
| 8,390,604 B2* | 3/2013 | Ryu | G09G 3/2096 345/204 |
| 8,996,740 B2* | 3/2015 | Wiley | H04L 25/02 375/259 |
| 9,286,826 B2* | 3/2016 | Wright | G09G 3/3208 |
| 9,319,218 B2* | 4/2016 | Pandey | H04B 3/00 |
| 9,413,565 B1* | 8/2016 | Jung | H04L 25/0278 |
| 9,626,033 B2* | 4/2017 | Fuchs | G06F 3/041 |
| 2006/0119380 A1* | 6/2006 | Gonzalez | H04L 25/0278 326/30 |
| 2007/0153445 A1* | 7/2007 | O'Mahony | H03K 5/15013 361/600 |
| 2007/0188187 A1 | 8/2007 | Oliva et al. | |
| 2008/0133799 A1 | 6/2008 | Voutilainen | |
| 2008/0211791 A1* | 9/2008 | Ryu | G09G 3/3688 345/204 |
| 2008/0212709 A1 | 9/2008 | Wiley et al. | |
| 2008/0278280 A1* | 11/2008 | Alexeyev | H03F 3/45183 340/2.29 |
| 2008/0291005 A1* | 11/2008 | Yukizane | H04B 3/56 340/538 |
| 2008/0316382 A1* | 12/2008 | Sato | G09G 3/3611 349/33 |
| 2009/0244036 A1* | 10/2009 | Morita | G09G 3/2096 345/204 |
| 2012/0309456 A1 | 12/2012 | Yamamoto et al. | |
| 2014/0254732 A1 | 9/2014 | Sengoku et al. | |
| 2014/0254733 A1 | 9/2014 | Sengoku et al. | |
| 2015/0023454 A1 | 1/2015 | Lee et al. | |
| 2015/0030112 A1 | 1/2015 | Wiley et al. | |
| 2015/0043693 A1 | 2/2015 | Lee et al. | |

OTHER PUBLICATIONS

Horowitz P., et al., "Radio Frequency Circuit Elements", The Art of Electronics, Jan. 1, 1989, Cambridge University Press, ISBN: 0-521-37095-7, pp. 881-882.

* cited by examiner

TERMINATION CIRCUIT TO REDUCE ATTENUATION OF SIGNAL BETWEEN SIGNAL PRODUCING CIRCUIT AND DISPLAY DEVICE

INTRODUCTION

1. Field

Aspects disclosed herein relate generally to a termination circuit to reduce attenuation of a signal between a signal producing circuit and a display device, and particularly, but not exclusively, to a termination circuit to reduce attenuation of a signal between a signal producing circuit and a display device both configured to meet the requirements of the MIPI® Alliance D-PHY™ specification, the MIPI® Alliance C-PHY™ specification, or both.

2. Description of the Related Art

Because of the high fixed costs associated with manufacturing components for display-capable mobile apparatuses (e.g., laptop computers, tablets, smartphones, etc.), the economics of producing these apparatuses depends upon large consumer markets. This, in turn, is subject to having the price for these apparatuses set sufficiently low so that large quantities can be sold. Consequently, profits from selling these apparatuses are highly susceptible to the costs of the materials used to manufacture the components.

Supporting a large consumer market is aided by the ability to provide a variety of types of display-capable mobile apparatuses to meet the various preferences of individual consumers. This has lent itself to an interchangeable approach in which, to meet the characteristics desired by a particular group of consumers, a first type of signal producing circuit (e.g., an application processor, etc.) can be selected to be connected via a cable to a display driver integrated circuit (DDIC) of a first type of display device. Likewise, to address the features favored by a different group of consumers, a second type of signal producing circuit can be designated to be connected via a cable to a DDIC of a second type of display device.

Such an interchangeable approach is possible if the signal producing circuit and the DDIC are configured, respectively, to transmit and to receive a display interface signal that conforms with an accepted specification such as, for example, the MIPI® Alliance D-PHY™ specification, the MIPI® Alliance C-PHY™ specification, or the Video Electronics Standards Association (VESA®) Mobile Display Digital Interface (MDDI) standard. Conventionally, a termination impedance component is included internal to the DDIC to provide a line termination function for a serial interface with the signal producing circuit (e.g., the D-PHY™ specification or the C-PHY™ specification).

The D-PHY™ specification supports high speed physical layer designs so that multiple applications can be run by the signal producing circuit and displayed on the display device. The D-PHY™ specification is directed to two-wire interfaces. MIPI® Alliance D-PHY™ v1.2, released Sep. 17, 2014, is expressly incorporated herein in its entirety by reference. The C-PHY™ specification uses three phase encoding and is directed to three-wire interfaces. MIPI® Alliance C-PHY™ v1.0, released Sep. 17, 2014, is expressly incorporated herein in its entirety by reference. The VESA® MDDI standard provides the requirements of a high speed digital packet interface and is directed to an environment in which the signal producing circuit is separated from the display device (e.g., the signal producing circuit is disposed in a first clamshell portion of a flip phone and the display device is disposed in a second clamshell portion of the flip phone, the display device is a projector, etc.). VESA® MDDI v1.2, released July of 2008, is expressly incorporated herein in its entirety by reference.

Because a mobile apparatus usually is powered by a battery, the MIPI® Alliance specifications recognize two types of signals. A power of a first type of signal is less than a power of a second type of signal so that the mobile apparatus can prolong a life of the battery by using the first type of signal. However, a frequency of the second type of signal is greater than a frequency of the first type of signal so that information can be conveyed at a higher speed by using the second type of signal. The first type of signal (i.e., the low power signal) represents information within a first range of amplitudes. The second type of signal (i.e., the high speed signal) represents information within a second range of amplitudes. The first range of amplitudes is greater than the second range of amplitudes. The VESA® MDDI standard only recognizes the second type of signal (i.e., the high speed signal).

The DDIC is usually mounted on a substrate of the display device. The substrate can be formed of glass. Often, a trace is disposed on the substrate between a mounting pad of the DDIC and an attachment point of the cable. Because profits from selling display-capable mobile apparatuses are highly susceptible to the costs of the materials used to manufacture the components of these apparatuses, the trace is usually made of Indium Tin Oxide (ITO). Unfortunately, an impedance of a trace made of ITO is substantially greater than an impedance of a termination impedance component included internal to the DDIC to provide the line termination function for the serial interface with the signal producing circuit. In some cases the trace is made of an aluminum alloy. Unfortunately, in these cases because the resistivity of the aluminum alloy is greater than the traces used for printed circuit boards (which are usually made of copper) and because the traces made of the aluminum alloy are usually very narrow, again, the impedance of a trace made of an aluminum alloy is substantially greater than an impedance of a termination impedance component included internal to the DDIC to provide the line termination function for the serial interface with the signal producing circuit.

The series impedance of the trace, made of ITO or an aluminum alloy, and the termination impedance component included internal to the DDIC to provide the line termination function for the serial interface with the signal producing circuit can significantly attenuate the display interface signal sent from the signal producing circuit to the DDIC. This situation can be particularly problematic if the display interface signal represents information within a relatively small range of amplitudes. Additionally, problems associated with attenuation of the display interface signal can also be present in a display-capable mobile apparatus that does not include a high impedance trace, but does include multiple DDICs that have internal termination impedance components to provide the line termination functions for the serial interface with the signal producing circuit and that are driven by a single signal producing circuit (e.g., a multi-drop configuration) due to the increased load presented by the termination impedance components internal to the multiple DDICs to provide the line termination functions for the serial interface with the signal producing circuit.

Problems associated with attenuation of the display interface signal have been addressed through a variety of techniques. In one technique, the signal producing circuit and the DDIC are configured, respectively, to transmit and to receive only the low power signal. Unfortunately, by losing the benefit of using the high speed signal, a display-capable mobile apparatus configured in this manner may have a reduced ability to display multiple applications. In another technique, used by a display-capable mobile apparatus having a multi-drop configuration, a timing control circuit is mounted on the cable at a point at which the cable divides into a plurality of lines, each of the plurality of lines connected to a corresponding DDIC. Using this technique, the signal producing circuit transmits the high speed signal to the timing control circuit, which demultiplexes the signal and conveys the signal to each of the DDICs. Because the frequency of the signal conveyed from the timing control circuit via one of the plurality of lines to a corresponding DDIC is less than the frequency of the signal transmitted from the signal producing circuit to the timing control circuit, information from the timing control circuit via one of the plurality of lines to a corresponding DDIC is conveyed at a slower speed than information from the signal producing circuit to the timing control circuit. Unfortunately, incorporating a timing control circuit into a display-capable mobile apparatus considerably increases the cost of the apparatus, the area consumed on the integrated circuit that includes the timing control circuit, and the additional power consumed by the timing control circuit.

SUMMARY

An exemplary aspect can be directed to a termination circuit. The termination circuit can include a first port, a second port, and an impedance component. The first port can be configured to be connected to a first node. The first node can be a node of a conductor of a cable. A first end of the cable can be configured to be connected to a signal producing circuit. A second end of the cable can be configured to be connected to a first end of a trace. The trace can be disposed on a substrate of a display device. A second end of the trace can be connected to a display driver integrated circuit. The display driver integrated circuit can lack a termination impedance component internal to the display driver integrated circuit to provide a line termination for a serial interface with the signal producing circuit. The second port can be configured to be connected to a second node. The impedance component can be connected between the first port and the second port.

Another exemplary aspect can be directed to an apparatus. The apparatus can include a signal producing circuit, a display device, a cable, and a termination circuit. The display device can have a display driver integrated circuit, a trace, and a substrate. The trace can be disposed on the substrate. The display driver integrated circuit can be connected to a first end of the trace. The display driver integrated circuit can lack a termination impedance component internal to the display driver integrated circuit to provide a line termination function for a serial interface with the signal producing circuit. The cable can have a first end of the cable connected to the signal producing circuit and a second end of the cable connected to a second end of the trace. The termination circuit can have a first port, a second port, and an impedance component. The first port can be connected to a first node. The first node can be a node of a conductor of the cable. The second port can be connected to a second node. The impedance component can be connected between the first port and the second port. The termination circuit can be formed as an integrated circuit. The integrated circuit can be mounted on the cable near the node of the conductor.

Yet another exemplary aspect can be directed to a termination circuit. The termination circuit can include a first port, a second port, and an impedance component. The first port can be configured to be connected to a first node. The first node can be a node of a first conductor of a cable. A first end of the cable can be configured to be connected to a signal producing circuit. A second end of the cable can be configured to be connected to a first display driver integrated circuit and to a second display driver integrated circuit. The first display driver integrated circuit can lack a termination impedance component internal to the first display driver integrated circuit to provide a line termination function for a serial interface with the signal producing circuit, the second display driver integrated circuit can lack a termination impedance component internal to the second display driver integrated circuit to provide the line termination function for the serial interface with the signal producing circuit, or both. The second port can be configured to be connected to a second node. The impedance component can be connected between the first port and the second port.

Still another exemplary aspect can be directed to an apparatus. The apparatus can include a signal producing circuit, a display device, a cable, and a termination circuit. The display device can have a first display driver integrated circuit and a second display driver integrated circuit. The first display driver integrated circuit can lack a termination impedance component internal to the first display driver integrated circuit to provide a line termination function for a serial interface with the signal producing circuit, the second display driver integrated circuit can lack a termination impedance component internal to the second display driver integrated circuit to provide the line termination function for the serial interface with the signal producing circuit, or both. The cable can have a first end of the cable connected to the signal producing circuit and a second end of the cable connected to the first display driver integrated circuit and to the second display driver integrated circuit. The termination circuit can have a first port, a second port, and an impedance component. The first port can be connected to a first node. The first node can be a node of a conductor of the cable. The second port can be connected to a second node. The impedance component can be connected between the first port and the second port. The termination circuit can be formed as an integrated circuit. The integrated circuit can be mounted on the cable near the node of the conductor.

BRIEF DESCRIPTION OF THE DRAWINGS

These and other sample aspects are described in the detailed description, the appended claims, and the accompanying drawings.

Figure 1:
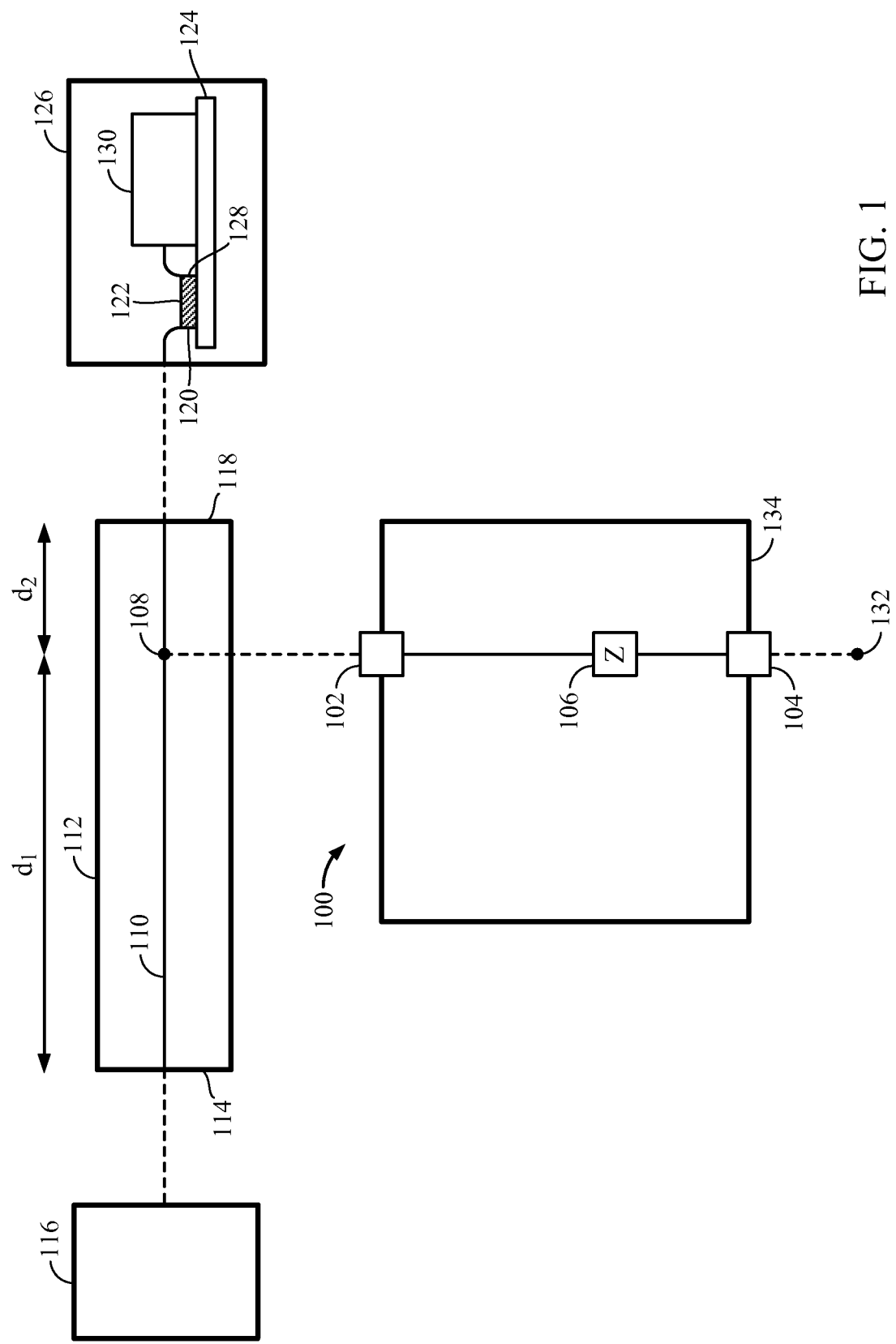
FIG. 1 is a block diagram illustrating an example of a termination circuit.

In accordance with common practice, various features illustrated in the drawings may not be drawn to scale. Accordingly, dimensions of the various features may be arbitrarily expanded or reduced for clarity. In addition, implementations illustrated in the drawings may be simplified for clarity. Thus, the drawings may not illustrate all of the components of a given apparatus or device. Finally, like reference numerals may be used throughout the specification and the drawings to denote like features.

DETAILED DESCRIPTION

Aspects disclosed herein relate generally to a termination circuit to reduce attenuation of a signal between a signal producing circuit and a display device, and particularly to a termination circuit to reduce attenuation of a signal between a signal producing circuit and a display device both configured to meet the requirements of the MIPI® Alliance D-PHY™ specification, the MIPI® Alliance C-PHY™ specification, or both.

To support a large consumer market, a display-capable mobile apparatus can be manufactured using an interchangeable approach in which a preferred type of signal producing circuit (e.g., an application processor, etc.) is connected via a cable to a display driver integrated circuit (DDIC) of a desired type of display device. Conventionally, a termination impedance component is included internal to the DDIC to provide a line termination function for a serial interface with the signal producing circuit (e.g., the D-PHY™ specification or the C-PHY™ specification). The DDIC can be mounted on a substrate of the display device. The substrate can be a glass. A trace can be disposed on the substrate between a mounting pad of the DDIC and an attachment point of the cable. Because profits from selling display-capable mobile apparatuses can be highly susceptible to the costs of the materials used to manufacture the components of these apparatuses, the trace is usually made of Indium Tin Oxide (ITO) or an aluminum alloy. Unfortunately, an impedance of a trace made of ITO or a narrow trace made of an aluminum alloy can be substantially greater than an impedance of a termination impedance component included internal to the DDIC to provide the line termination function for the serial interface with the signal producing circuit. For example, the impedance of the trace can be in a range from about 5 ohms to about 80 ohms while the impedance of the termination impedance component can be about 50 ohms. (Additionally, for example, an impedance of a bond at the attachment point of the cable can be about 2.4 ohms and an impedance of a bond at the mounting pad of the DDIC can be about 20 ohms.)

The series impedance of the trace disposed on the substrate (and the bond at the attachment point of the cable and the bond at the mounting pad of the DDIC) and the termination impedance component included internal to the DDIC to provide the line termination function for the serial interface with the signal producing circuit can significantly attenuate a display interface signal sent from the signal producing circuit to the DDIC. For example, using values of the impedances presented above, the display interface signal can be presented with an impedance of up to about 152.4 ohms between the attachment point of the cable and a processing portion of the DDIC. This situation can be particularly problematic if the display interface signal represents information within a relatively small range of amplitudes. Additionally, problems associated with attenuation of the display interface signal can also be present in a display-capable mobile apparatus that does not include high impedance traces, but does include multiple DDICs that have internal termination impedance components to provide the line termination functions for the serial interface with the signal producing circuit and that are driven by a single signal producing circuit (e.g., a multi-drop configuration) due to the increased load presented by the multiple DDICs to provide the line termination functions for the serial interface with the signal producing circuit.

In an aspect, to address the problems described above: (1) the DDIC can be configured to lack a termination impedance component internal to the DDIC to provide the line termination function for the serial interface with the signal producing circuit and (2) a termination circuit can be configured to connect an impedance component between a first node and a second node. The first node can be a node of a conductor of the cable. A voltage of the second node can be set, for example, to ground. This arrangement can cause the series impedance of the trace disposed on the substrate (and the bond at the attachment point of the cable and the bond at the mounting pad of the DDIC) to be in parallel with the impedance component connected between the first node and the second node. The parallel impedance of the impedance component connected between the first node and the second node and the series impedance of the trace disposed on the substrate (and the bond at the attachment point of the cable and the bond at the mounting pad of the DDIC) can significantly reduce a degree of attenuation of a display interface signal sent from the signal producing circuit to the DDIC. For example, using this arrangement and the values of the impedances presented above, the display interface signal can be presented with an impedance of about 42.25 ohms between the attachment point of the cable and the processing portion of the DDIC. This is a substantial reduction from the impedance of about 322.4 ohms that is presented to the display interface signal when the DDIC is configured in a conventional manner. This aspect can be especially advantageous if the display interface signal represents information within a relatively small range of amplitudes.

FIG. 1 is a block diagram illustrating an example of a termination circuit 100. The termination circuit 100 can include a first port 102, a second port 104, and a first impedance component 106. The first port 102 can be configured to be connected to a first node 108. The first node 108 can be a node of a first conductor 110 of a cable 112. A first end 114 of the cable 112 can be configured to be connected to a signal producing circuit 116. A second end 118 of the cable 112 can be configured to be connected to a first end 120 of a trace 122. The trace 122 can be disposed on a substrate 124 of a display device 126. In an aspect, the substrate 124 can be a glass. A second end 128 of the trace 122 can be connected to a display driver integrated circuit (DDIC) 130. The DDIC 130 can lack a termination impedance component internal to the DDIC 130 to provide a line termination function for a serial interface with the signal producing circuit 116. The second port 104 can be configured to be connected to a second node 132. A voltage of the second node 132 can be set, for example, to ground. The first impedance component 106 can be connected between the first port 102 and the second port 104. Optionally, the termination circuit 100 can be formed as an integrated circuit 134.

When the first port 102 is connected to the first node 108, the second port 104 is connected to the second node 132, and the second end 128 of the trace 122 is connected to the DDIC 130, the series impedance of the trace 122 (and the bond at the attachment point (not illustrated) of the cable 112 and the bond at the mounting pad (not illustrated) of the DDIC 130) is in parallel with the first impedance component 106 so that the impedance between the attachment point of the cable 112 and the processing portion of the DDIC 130 presented to a display interface signal is reduced as described above.

Figure 2:
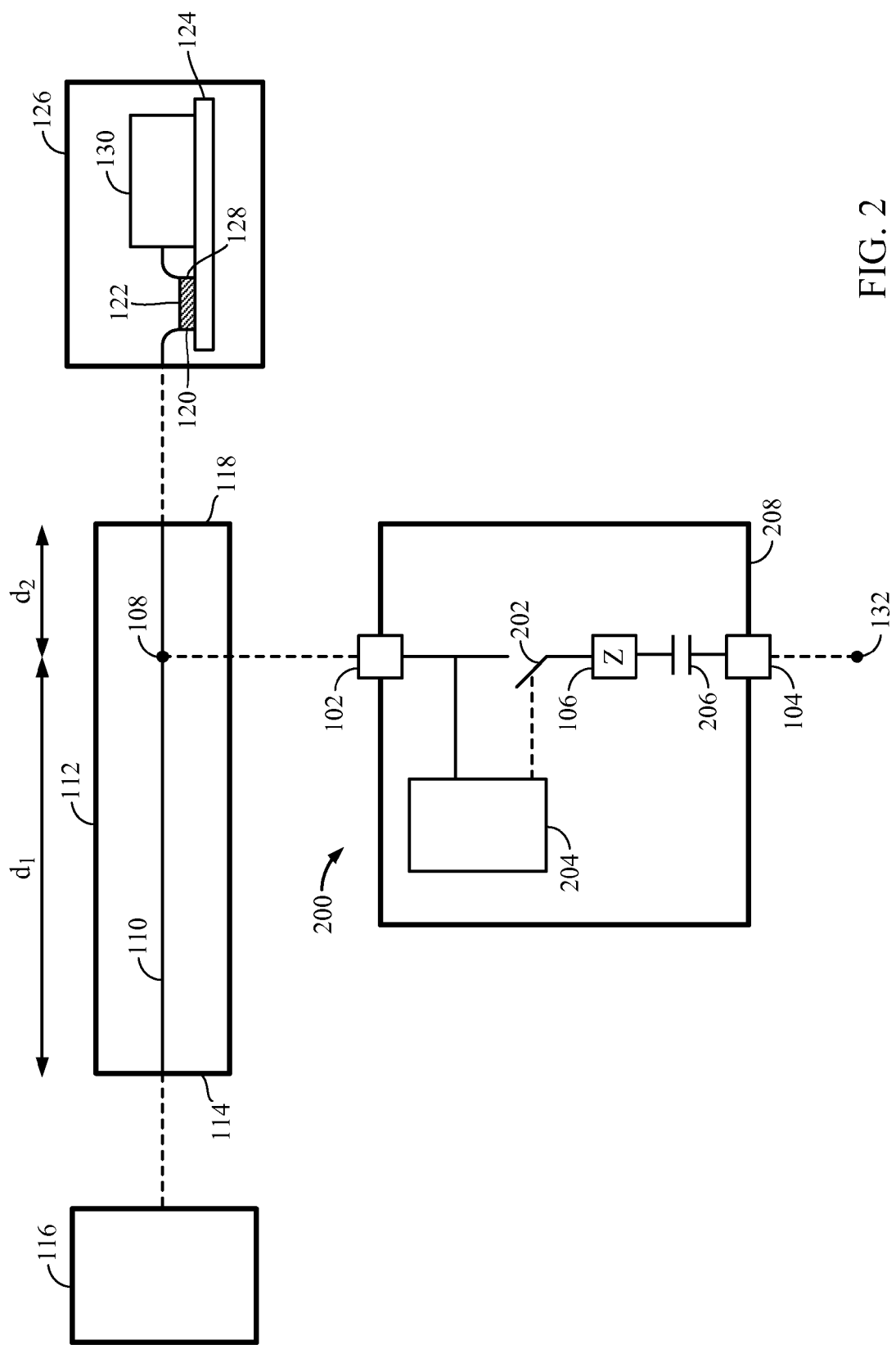
FIG. 2 is a block diagram illustrating another example of a termination circuit.

FIG. 2 is a block diagram illustrating an example of a termination circuit 200. The termination circuit 200 can include the termination circuit 100 and at least one additional optional component.

For example, the termination circuit 200 can include a first switch 202. The first switch 202 can be connected between the first impedance component 106 and the first port 102 (illustrated) or the first switch 202 can be connected between the first impedance component 106 and the second port 104 (not illustrated). By way of example, and not by way of limitation, the first switch 202 can include a relay, a semiconductor device, a microelectromechanical switch, the like, or any combination thereof. The semiconductor device can be a transistor.

For example, the termination circuit 200 can include a logic circuit 204. The logic circuit 204 can be connected to the first port 102. The logic circuit 204 can be configured to open the first switch 202 in response to an indication that the signal producing circuit 116 is or will be configured to produce a first type of signal. The logic circuit 204 can be configured to close the first switch 202 in response to an indication that the signal producing circuit 116 is or will be configured to produce a second type of signal. The first type of signal can represent information within a first range of amplitudes. The second type of signal can represent information within a second range of amplitudes. For example, the first range of amplitudes can be greater than the second range of amplitudes. For example, a power of the first type of signal can be less than a power of the second type of signal. For example, a frequency of the second type of signal can be greater than a frequency of the first type of signal.

Because the power of the first type of signal can be less than the power of the second type of signal, it can be desirable to disconnect the first impedance component 106 from the first node 108 so that the power of the first type of signal can be wholly directed to the DDIC 130 without a portion of the power of the first type of signal dissipated to the second node 132 through the first impedance component 106.

As described above, the logic circuit 204 can be configured to open the first switch 202 in response to the indication that the signal producing circuit 116 is or will be configured to produce the first type of signal and can be configured to close the first switch 202 in response to the indication that the signal producing circuit 116 is or will be configured to produce the second type of signal. Because the range of amplitudes for the first type of signal can be greater than the range of amplitudes for the second type of signal, in an aspect, the logic circuit 204 can include an amplitude measurement circuit (not illustrated) to determine whether the signal producing circuit 116 is producing the first type of signal or the second type of signal. Alternatively, because the power of the first type of signal can be less than the power of the second type of signal, in an aspect, the logic circuit 204 can include a power measurement circuit (not illustrated) to determine whether the signal producing circuit 116 is producing the first type of signal or the second type of signal. Alternatively, because the frequency of the second type of signal can be greater than the frequency of the first type of signal, in an aspect, the logic circuit 204 can include a frequency measurement circuit (not illustrated) to determine whether the signal producing circuit 116 is producing the first type of signal or the second type of signal. Alternatively, in an aspect, the logic circuit 204 can include any combination of the amplitude measurement circuit, the power measurement circuit, or the frequency measurement circuit.

Alternatively, in an example, the indication that the signal producing circuit 116 will be configured to produce the first type of signal can include an item of information within the second type of signal indicating that the signal producing circuit 116 will be configured to produce the first type of signal.

Alternatively, in an example, the indication that the signal producing circuit 116 will be configured to produce the second type of signal can include an item of information within the first type of signal that indicates that the signal producing circuit 116 will be configured to produce the second type of signal. This signalling can eliminate the conventional large-amplitude low-power mode.

Alternatively, in an example, rather than being connected to the first port 102, the logic circuit 204 can be configured to include a sensing port (not illustrated). The logic circuit 204 can be configured to receive an out-of-band signal from the signal producing circuit 116. The out-of-band signal can include the indication that the signal producing circuit is or will be configured to produce the first type of signal, the indication that the signal producing circuit is or will be configured to produce the second type of signal, or both.

Figure 3:
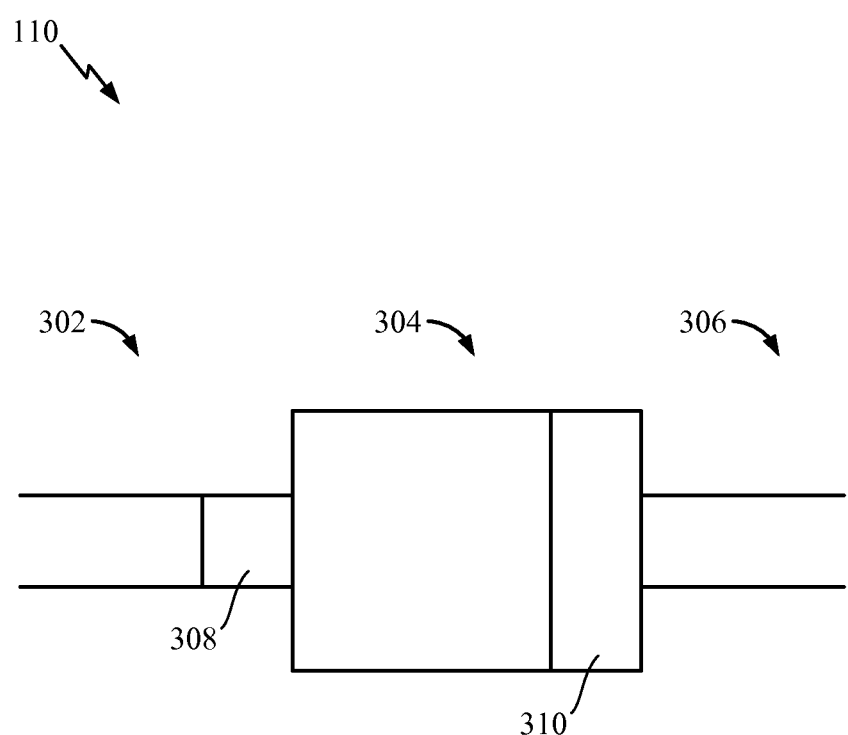
FIG. 3 is a timing diagram illustrating an example of a portion of the first conductor illustrated in FIGS. 1 and 2 conveying two types of signals.

FIG. 3 is a timing diagram illustrating an example of a portion of the first conductor 110 conveying two types of signals. The two types of signals can include, for example, a first occurrence 302 of the second type of signal, a first occurrence 304 of the first type of signal, and a second occurrence 306 of the second type of signal. The first occurrence 302 of the second type of signal can include an item of information 308 that indicates that the signal producing circuit 116 will be configured to produce the first type of signal.

With reference to FIG. 2, in an aspect, the logic circuit 204 can include a processing circuit (not illustrated) to determine if the second type of signal includes the item of information 308 that indicates that the signal producing circuit 116 will be configured to produce the first type of signal. Advantageously in this aspect, the logic circuit 204 can be configured to open the first switch 202 before the signal producing circuit 116 is configured to produce the first type of signal.

Alternatively, in an aspect, the indication that the signal producing circuit 116 will be configured to produce the second type of signal can include an item of information within the first type of signal that indicates that the signal producing circuit 116 will be configured to produce the second type of signal.

With reference to FIG. 3, the first occurrence 304 of the first type of signal can include an item of information 310 that indicates that the signal producing circuit 116 will be configured to produce the second type of signal.

With reference to FIG. 2, in an aspect, the logic circuit 204 can include a processing circuit (not illustrated) to determine if the first type of signal includes the item of information 310 that indicates that the signal producing circuit 116 will be configured to produce the second type of signal. Advantageously in this aspect, the logic circuit 204 can be configured to close the first switch 202 before the signal producing circuit 116 is configured to produce the second type of signal.

For example, the termination circuit 200 can include a capacitor 206. The capacitor 206 can be connected between the first impedance component 106 and the second port 104. The capacitor 206 can act to mitigate an effect of a transient associated with changing a position of the first switch 202.

Optionally, the termination circuit 200, including the termination circuit 100 and any of the first switch 202, the logic circuit 204, the capacitor 206, or any combination thereof, can be formed as an integrated circuit 208.

Figure 4:
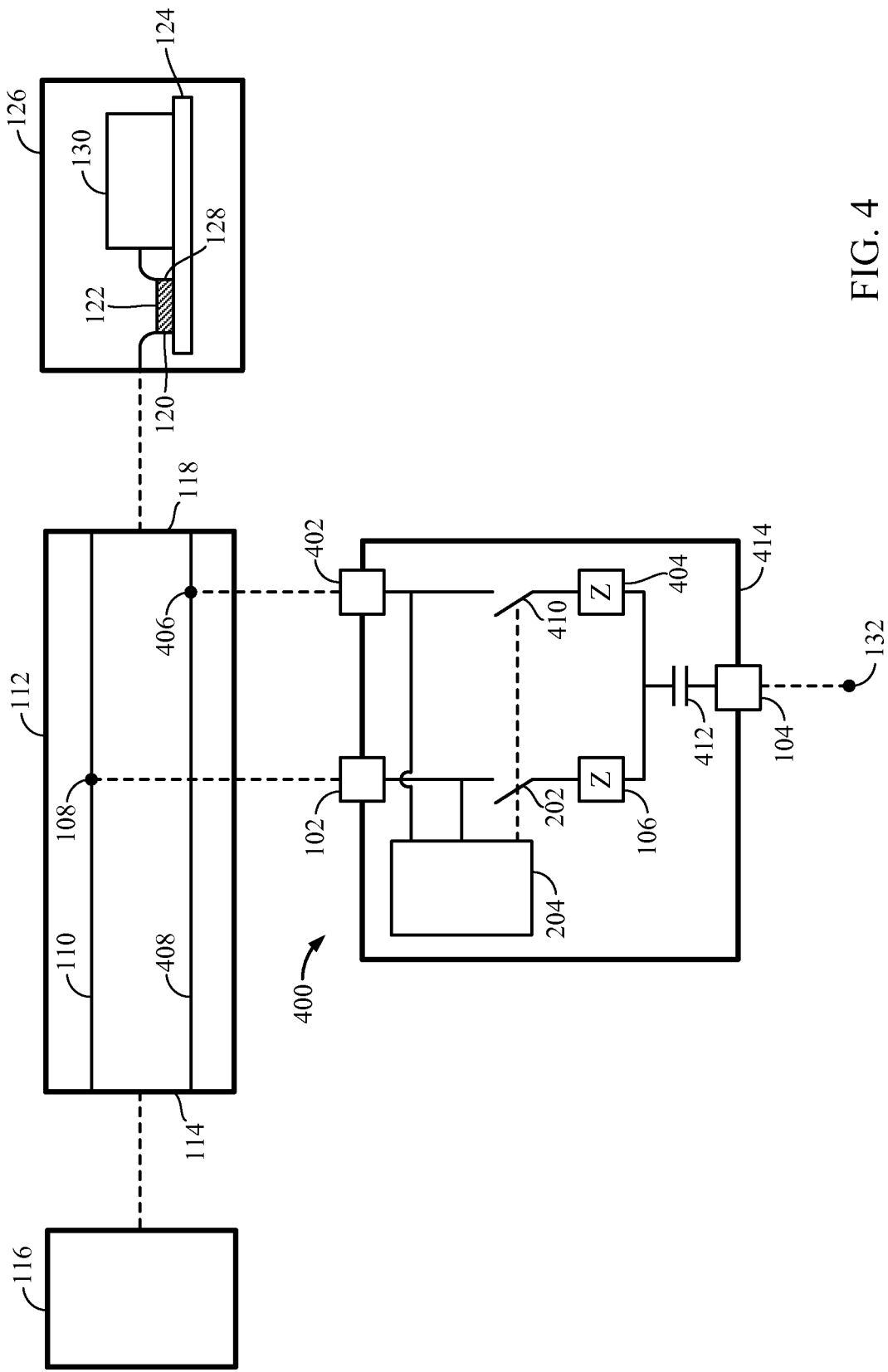
FIG. 4 is a block diagram illustrating another example of a termination circuit.

FIG. 4 is a block diagram illustrating an example of a termination circuit 400. The termination circuit 400 can include the termination circuit 100 or the termination circuit 200, a third port 402, and a second impedance component 404. The third port 402 can be configured to be connected to a third node 406. The third node 406 can be a node of a second conductor 408 of the cable 112. The second impedance component 404 can be connected between the third port 402 and the second port 104. The termination circuit 400 can be used, for example, for a display interface signal that conforms with the MIPI® Alliance D-PHY™ specification.

The termination circuit 400 can further include at least one optional component.

For example, the termination circuit 400 can include a second switch 410. The second switch 410 can be connected between the second impedance component 404 and the third port 402 (illustrated) or the second switch 410 can be connected between the second impedance component 404 and the second port 104 (not illustrated). By way of example, and not by way of limitation, the second switch 410 can include a relay, a semiconductor device, a microelectromechanical switch, the like, or any combination thereof. The semiconductor device can be a transistor.

For example, the termination circuit 400 can include the logic circuit 204. The logic circuit 204 can be connected to the third port 402. The logic circuit 204 can be configured to open the second switch 410 in response to the indication that the signal producing circuit 116 is or will be configured to produce the first type of signal. The logic circuit 204 can be configured to close the second switch 410 in response to the indication that the signal producing circuit 116 is or will be configured to produce the second type of signal.

For example, the termination circuit 400 can include a capacitor 412. The capacitor 412 can be connected between the first impedance component 106 and the second port 104 and connected between the second impedance component 404 and the second port 104. The capacitor 412 can be a common-mode alternating current termination. The capacitor 412 can ensure a proper termination of the receiver for the second type of signal at higher frequencies. Because the second type of signal can operate at higher frequencies, having the capacitor 412 can ensure that common-mode reflection requirements are met.

Optionally, the termination circuit 400, including the termination circuit 100 or the termination circuit 200 and any of the second switch 410, the capacitor 412, or any combination thereof, can be formed as an integrated circuit 414.

Figure 5:
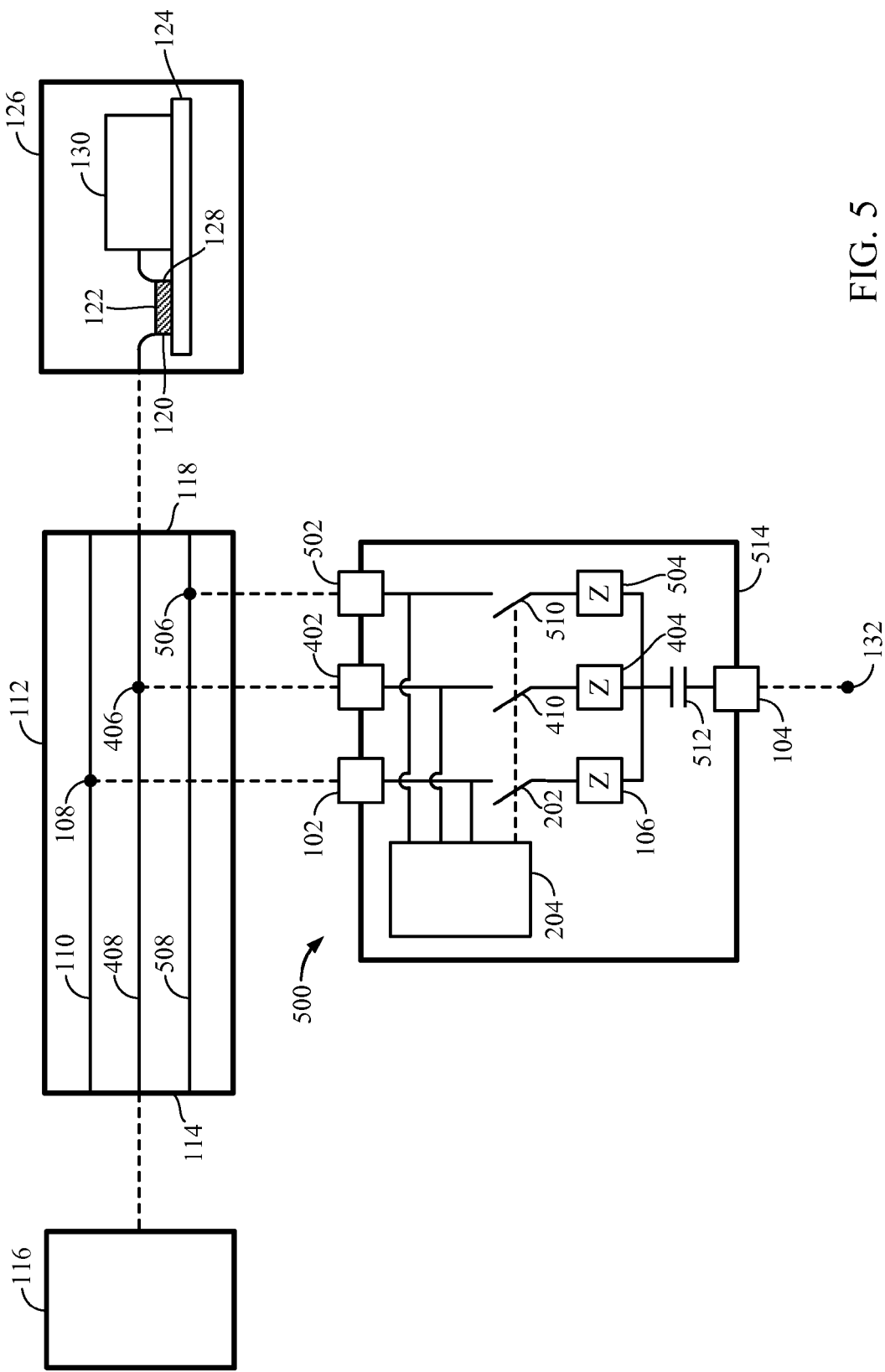
FIG. 5 is a block diagram illustrating another example of a termination circuit.

FIG. 5 is a block diagram illustrating an example of a termination circuit 500. The termination circuit 500 can include the termination circuit 400, a fourth port 502, and a third impedance component 504. The fourth port 502 can be configured to be connected to a fourth node 506. The fourth node 506 can be a node of a third conductor 508 of the cable 112. The third impedance component 504 can be connected between the fourth port 502 and the second port 104. The termination circuit 500 can be used, for example, for a display interface signal that conforms with the MIPI® Alliance C-PHY™ specification.

The termination circuit 500 can further include at least one optional component.

For example, the termination circuit 500 can include a third switch 510. The third switch 510 can be connected between the third impendance component 504 and the fourth port 502 (illustrated) or the third switch 510 can be connected between the third impedance component 504 and the second port 104 (not illustrated). By way of example, and not by way of limitation, the third switch 510 can include a relay, a semiconductor device, a microelectromechanical switch, the like, or any combination thereof. The semiconductor device can be a transistor.

For example, the termination circuit 500 can include the logic circuit 204. The logic circuit 204 can be connected to the fourth port 502. The logic circuit 204 can be configured to open the third switch 510 in response to the indication that the signal producing circuit 116 is or will be configured to produce the first type of signal. The logic circuit 204 can be configured to close the third switch 510 in response to the indication that the signal producing circuit 116 is or will be configured to produce the second type of signal.

For example, the termination circuit 500 can include a capacitor 512. The capacitor 512 can be connected between the first impedance component 106 and the second port 104, connected between the second impedance component 404 and the second port 104, and connected between the third impedance component 504 and the second port 104. The capacitor 512 can be a common-mode alternating current termination. The capacitor 512 can ensure a proper termination of the receiver for the second type of signal at higher frequencies. Because the second type of signal can operate at higher frequencies, having the capacitor 512 can ensure that common-mode reflection requirements are met.

Optionally, the termination circuit 500, including the termination circuit 400 and any of the third switch 510, the capacitor 512, or any combination thereof, can be formed as an integrated circuit 514.

Figure 6:
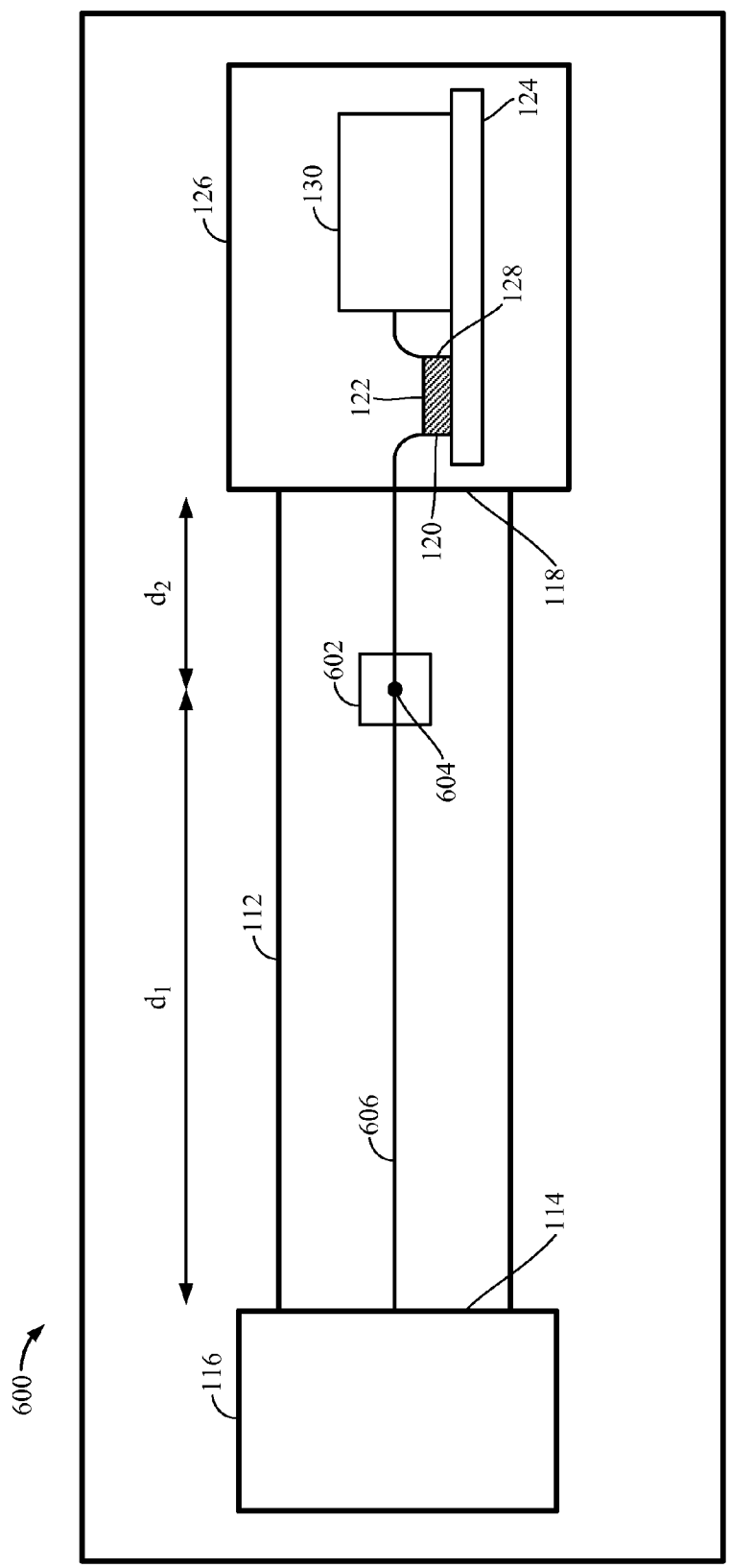
FIG. 6 is a block diagram illustrating an example of an apparatus that incorporates the termination circuit.

FIG. 6 is a block diagram illustrating an example of an apparatus 600 that incorporates the termination circuit. For example, the apparatus 600 can include a display-capable mobile apparatus. The apparatus 600 can include the signal producing circuit 116, the display device 126, the cable 112, and a termination circuit 602. For example, the signal producing circuit 116 can include an application processor. The display device 126 can have the DDIC 130, the trace 122, and the substrate 124. The trace 122 can be disposed on the substrate 124. For example, the trace can be made of a high resistance material. In an aspect, the high resistance material can include Indium Tin Oxide (ITO) or a trace (e.g., a narrow trace) formed of an aluminum alloy. The DDIC 130 can be connected to the second end 128 of the trace 122. The DDIC 130 can lack a termination impedance component internal to the DDIC 130 to provide a line termination function for a serial interface with the signal producing circuit 116. The cable 112 can have the first end 114 of the cable 112 connected to the signal producing circuit 116 and the second end 118 of the cable 112 connected to the first end 120 of the trace 122.

The termination circuit 602 can be the termination circuit 100, the termination circuit 200, the termination circuit 400, or the termination circuit 500. The termination circuit 602 can be formed as the integrated circuit 134, the integrated circuit 208, the integrated circuit 414, or the integrated circuit 514. The integrated circuit can be mounted on the cable 112 near a node 604 of a conductor 606 of the cable 112. The node 604 can be located, for example, nearer to the second end 118 of the cable 112 than to the first end 114 of the cable 112. The node 604 can include at least one of the first node 108, the third node 406, or the fourth node 506. The conductor 606 can include at least one of the first conductor 110, the second conductor 408, or the third conductor 508. For example, at least one of the first port 102, the third port 402, or the fourth port 502 can be connected, respectively, to the first node 108, the third node 406, or the fourth node 506 by a wire, a pin, a lead, a solder ball, or the like. A voltage of the second node 132 can be set, for example, to ground.

Figure 7:
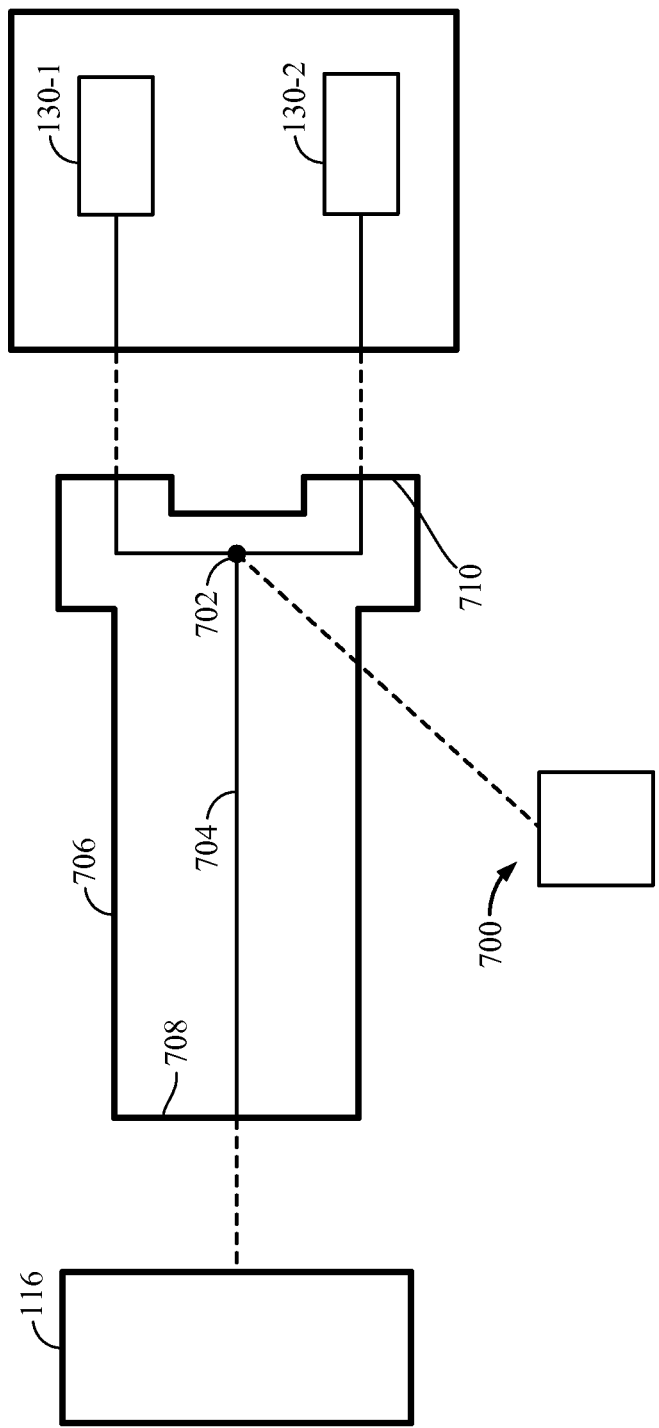
FIG. 7 is a block diagram illustrating another example of a termination circuit.

FIG. 7 is a block diagram illustrating an example of a termination circuit 700. The termination circuit 700 can be the termination circuit 100, the termination circuit 200, the termination circuit 400, or the termination circuit 500. Optionally, the termination circuit 700 can be formed as the integrated circuit 134, the integrated circuit 208, the integrated circuit 414, or the integrated circuit 514. The termination circuit 700 can be configured to be connected to a node 702 of a conductor 704 of a cable 706. The node 702 can include at least one of the first node 108, the third node 406, or the fourth node 506. The conductor 704 can include at least one of the first conductor 110, the second conductor 408, or the third conductor 508. A first end 708 of the cable 706 can be configured to be connected to the signal producing circuit 116. A second end 710 of the cable 706 can be configured to be connected to a first DDIC 130-1 and to a second DDIC 130-2. At least one of the first DDIC 130-1 can lack a termination impedance component internal to the first DDIC 130-1 to provide a line termination function for a serial interface with the signal producing circuit 116 or the second DDIC 130-2 can lack a termination impedance component internal to the second DDIC 130-2 to provide the line termination function for the serial interface with the signal producing circuit 116.

Figure 8:
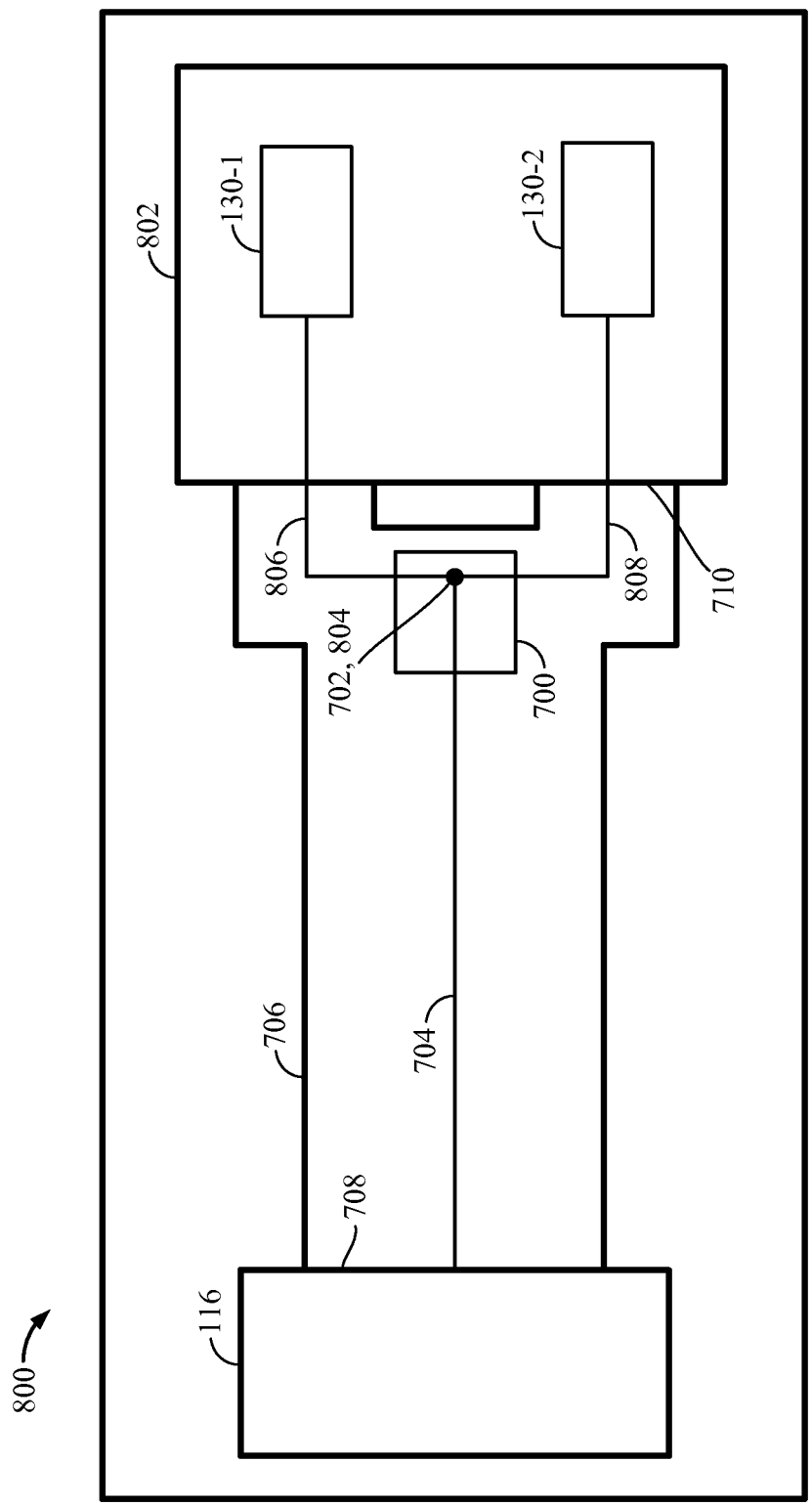
FIG. 8 is a block diagram illustrating another example of an apparatus that incorporates the termination circuit.

FIG. 8 is a block diagram illustrating another example of an apparatus 800 that incorporates the termination circuit. For example, the apparatus 800 can include a display-capable mobile apparatus. The apparatus 800 can include the signal producing circuit 116, a display device 802, the cable 706, and the termination circuit 700. For example, the signal producing circuit 116 can include an application processor. The display device 802 can have the first DDIC 130-1 and the second DDIC 130-2. At least one of the first DDIC 130-1 can lack a termination impedance component internal to the first DDIC 130-1 to provide a line termination function for a serial interface with the signal producing circuit 116 or the second DDIC 130-2 can lack a termination impedance component internal to the second DDIC 130-2 to provide the line termination function for the serial interface with the signal producing circuit 116. The cable 706 can have the first end 708 of the cable 706 connected to the signal producing circuit 116 and the second end 710 of the cable 706 connected to the first DDIC 130-1 and to the second DDIC 130-2. The node 702 can be located, for example, nearer to the second end 710 of the cable 706 than to the first end 708 of the cable 706. The node 702 can be located, for example, near to a point 804 at which the conductor 704 divides into a first line 806 and a second line 808. The first line 806 can be connected to the first DDIC 130-1 and the second line 808 can be connected to the second DDIC 130-2.

Those of skill in the art appreciate that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

The present Application for Patent is related to the following U.S. patent applications:

- U.S. patent application Ser. No. 14/336,572 entitled "THREE PHASE CLOCK RECOVERY DELAY RECOVERY CALIBRATION" filed Jul. 21, 2014, assigned to the assignee hereof, and expressly incorporated herein in its entirety by reference;
- U.S. patent application Ser. No. 14/336,977 entitled "MULTI-PHASE CLOCK GENERATION METHOD" filed Jul. 21, 2014, assigned to the assignee hereof, and expressly incorporated herein in its entirety by reference;
- U.S. patent application Ser. No. 14/453,346 entitled "N-PHASE SIGNAL TRANSITION ALIGNMENT" filed Aug. 6, 2014, assigned to the assignee hereof, and expressly incorporated herein in its entirety by reference;
- U.S. patent application Ser. No. 14/199,898 entitled "TRANSCODING METHOD FOR MULTI-WIRE SIGNALING THAT EMBEDS CLOCK INFORMATION IN TRANSITION OF SIGNAL STATE" filed Mar. 6, 2014, assigned to the assignee hereof, and expressly incorporated herein in its entirety by reference;
- U.S. patent application Ser. No. 14/199,322 entitled "CIRCUIT TO RECOVER A CLOCK SIGNAL FROM MULTIPLE WIRE DATA SIGNALS THAT CHANGES STATE EVERY STATE CYCLE AND IS IMMUNE TO DATA INTER-LANE SKEW AS WELL AS DATA STATE TRANSITION GLITCHES" filed Mar. 6, 2014, assigned to the assignee hereof, and expressly incorporated herein in its entirety by reference; and
- U.S. patent application Ser. No. 11/712,941 entitled "THREE PHASE AND POLARITY ENCODED SERIAL INTERFACE" filed Mar. 2, 2007, which issued Nov. 22, 2011 as U.S. Pat. No. 8,064,535, assigned to the assignee hereof, and expressly incorporated herein in its entirety by reference.

As used herein, the term "exemplary" means "serving as an example, instance, or illustration." Any example described as "exemplary" is not necessarily to be construed as preferred or advantageous over other examples. Likewise, the term "examples" does not require that all examples include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted that the terms "connected," "coupled," and any variant thereof, mean any connection or coupling between elements, either direct or indirect, and can encompass a presence of an intermediate element between two elements that are "connected" or "coupled" together via the intermediate element. Coupling and connection between the elements can be physical, logical, or a combination thereof. Elements can be "connected" or "coupled" together, for example, by using one or more wires, cables, printed electrical connections, electromagnetic energy, and the like. The electromagnetic energy can have a wavelength at a radio frequency, a microwave frequency, a visible optical frequency, an invisible optical frequency, and the like, as practicable. These are several non-limiting and non-exhaustive examples.

The term "signal" can include any signal such as a data signal, an audio signal, a video signal, a multimedia signal, an analog signal, a digital signal, and the like. Information and signals described herein can be represented using any of a variety of different technologies and techniques. For example, data, an instruction, a process step, a process block, a command, information, a signal, a bit, a symbol, and the like that are references herein can be represented by a voltage, a current, an electromagnetic wave, a magnetic field, a magnetic particle, an optical field, and optical particle, and/or any practical combination thereof, depending at least in part on the particular application, at least in part on the desired design, at least in part on the corresponding technology, and/or at least in part on like factors.

A reference using a designation such as "first," "second," and so forth does not limit either the quantity or the order of those elements. Rather, these designations are used as a convenient method of distinguishing between two or more elements or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements." For example, this terminology can include A, or B, or C, or A and B, or A and C, or A and B and C, or 2A, or 2B, or 2C, and so on.

The terminology used herein is for the purpose of describing particular examples only and is not intended to be limiting. As used herein, the singular forms "a," "an," and "the" include the plural forms as well, unless the context clearly indicates otherwise. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

In at least one example, the provided apparatuses can be a part of, and/or coupled to, an electronic device such as, but not limited to, at least one of a mobile device, a navigation device (e.g., a global positioning system receiver), a wireless device a camera, an audio player, a camcorder, and a game console.

The term "mobile device" can describe, and is not limited to, at least one of a mobile phone, a mobile communication device, a pager, a personal digital assistant, a personal information manager, a personal data assistant, a mobile hand-held computer, a portable computer, a tablet computer, a wireless device, a wireless modem, other types of portable electronic devices typically carried by a person and having communication capabilities (e.g., wireless, cellular, infrared, short-range radio, etc.), and/or any other device that is capable of receiving wireless communication signals used in determining a position fix. Further, the terms "user equipment" (UE), "mobile terminal," "user device," "mobile device," and "wireless device" can be interchangeable.

Nothing stated or depicted in this application is intended to dedicate any component, step, block, feature, object, benefit, advantage, or equivalent to the public, regardless of whether the component, step, block, feature, object, benefit, advantage, or the equivalent is recited in the claims.

While the foregoing description provides illustrative aspects, it is noted that various changes and modifications can be made to these illustrative aspects without departing from the scope defined by the appended claims.

What is claimed is:

1. A termination circuit, comprising:
   a first port configured to be connected to a first node of a first conductor of a cable, wherein
      a first end of the cable is configured to be connected to a signal producing circuit,
      a second end of the cable is configured to be connected to a first end of a trace disposed on a substrate of a display device,
      a second end of the trace is connected to a display driver integrated circuit (DDIC), and
      the DDIC lacks a termination impedance component internal to the DDIC to provide a line termination function for a serial interface with the signal producing circuit;
   a second port configured to be connected to a second node; and
   a first impedance component connected between the first port and the second port,
   wherein the first node of the cable is in between the first end and the second end of the cable.

2. The termination circuit of claim 1, further comprising a capacitor connected between the first impedance component and the second port.

3. The termination circuit of claim 1, further comprising:
   a first switch connected between the first impedance component and one of the first port or the second port.

4. The termination circuit of claim 3, wherein the first switch comprises at least one of a relay, a semiconductor device, or a microelectromechanical switch.

5. The termination circuit of claim 3, further comprising:
   a logic circuit
      configured to open the first switch in response to an indication that the signal producing circuit is or will be configured to produce a first type of signal, and
      configured to close the first switch in response to an indication that the signal producing circuit is or will be configured to produce a second type of signal, wherein
   the first type of signal represents information within a first range of amplitudes,
   the second type of signal represents information within a second range of amplitudes, and
   the first range of amplitudes is greater than the second range of amplitudes.

6. The termination circuit of claim 3, further comprising:
   a logic circuit connected to the first port,
      configured to open the first switch in response to an indication that the signal producing circuit is or will be configured to produce a first type of signal, and
      configured to close the first switch in response to an indication that the signal producing circuit is or will be configured to produce a second type of signal, wherein
   the first type of signal represents information within a first range of amplitudes,
   the second type of signal represents information within a second range of amplitudes, and
   the first range of amplitudes is greater than the second range of amplitudes.

7. The termination circuit of claim 6, wherein the first impedance component, the first switch, and the logic circuit are formed as an integrated circuit.

8. The termination circuit of claim 6, wherein a power of the first type of signal is less than a power of the second type of signal.

9. The termination circuit of claim 6, wherein a frequency of the second type of signal is greater than a frequency of the first type of signal.

10. The termination circuit of claim 6, wherein the indication that the signal producing circuit is or will be configured to produce the first type of signal comprises an item of information within the second type of signal that indicates that the signal producing circuit will be configured to produce the first type of signal.

11. The termination circuit of claim 6, wherein the indication that the signal producing circuit is or will be configured to produce the second type of signal is an item of information within the first type of signal that indicates that the signal producing circuit will be configured to produce the second type of signal.

12. The termination circuit of claim 11, wherein the logic circuit is configured to close the first switch before the signal producing circuit is configured to produce the second type of signal.

13. The termination circuit of claim 6, further comprising:
a third port configured to be connected to a third node of a second conductor of the cable;
a second impedance component connected between the third port and the second port;
a second switch connected between the second impedance component and one of the third port or the second port,
wherein the logic circuit
is connected to the third port,
is configured to open the second switch in response to the indication that the signal producing circuit is or will be configured to produce the first type of signal, and
is configured to close the second switch in response to the indication that the signal producing circuit is or will be configured to produce the second type of signal, and
wherein the third node is in between the first end and the second end of the cable.

14. The termination circuit of claim 13, further comprising a capacitor
connected between the first impedance component and the second port, and
connected between the second impedance component and the second port.

15. The termination circuit of claim 13, further comprising:
a fourth port configured to be connected to a fourth node of a third conductor of the cable;
a third impedance component connected between the fourth port and the second port; and
a third switch connected between the third impedance component and one of the fourth port or the second port,
wherein the logic circuit
is connected to the fourth port,
is configured to open the third switch in response to the indication that the signal producing circuit is or will be configured to produce the first type of signal, and
is configured to close the third switch in response to the indication that the signal producing circuit is or will be configured to produce the second type of signal, and
wherein the fourth node is in between the first end and the second end of the cable.

16. The termination circuit of claim 15, further comprising a capacitor
connected between the first impedance component and the second port,
connected between the second impedance component and the second port, and
connected between the third impedance component and the second port.

17. An apparatus, comprising:
a signal producing circuit;
a display device having a display driver integrated circuit (DDIC), a trace, and a substrate,
the trace disposed on the substrate,
the DDIC connected to a first end of the trace,
the DDIC lacking a termination impedance component internal to the DDIC to provide a line termination function for a serial interface with the signal producing circuit;
a cable having a first end of the cable connected to the signal producing circuit and a second end of the cable connected to a second end of the trace; and
a termination circuit having a first port, a second port, and an impedance component,
the first port connected to a first node of a conductor of the cable,
the second port connected to a second node, and
the impedance component connected between the first port and the second port,
wherein the termination circuit is formed as an integrated circuit mounted on the cable near the first node of the conductor, and
wherein the first node of the cable is in between the first end and the second end of the cable.

18. The apparatus of claim 17, wherein the termination circuit further comprises a switch and a logic circuit,
the switch connected between the impedance component and one of the first port or the second port, and
the logic circuit
connected to the first port,
configured to open the switch in response to an indication that the signal producing circuit is or will be configured to produce a first type of signal, and
configured to close the switch in response to an indication that the signal producing circuit is or will be configured to produce a second type of signal, wherein
the first type of signal represents information within a first range of amplitudes,
the second type of signal represents information within a second range of amplitudes, and
the first range of amplitudes is greater than the second range of amplitudes.

19. The apparatus of claim 17, wherein the first node of the conductor is located nearer to the second end of the cable than to the first end of the cable.

20. The apparatus of claim 17, wherein the signal producing circuit comprises an application processor.

21. The apparatus of claim 17, wherein the trace is made of a high resistance material.

22. The apparatus of claim 17, wherein a voltage of the second node is set to ground.

23. A termination circuit, comprising:
a first port configured to be connected to a first node of a first conductor of a cable, wherein
a first end of the cable is configured to be connected to a signal producing circuit,
a second end of the cable is configured to be connected to a first display driver integrated circuit (DDIC) and to a second DDIC, and
at least one of
the first DDIC lacks a termination impedance component internal to the first DDIC to provide a line termination function for a serial interface with the signal producing circuit, or
the second DDIC lacks a termination impedance component internal to the second DDIC to provide the line termination function for the serial interface with the signal producing circuit;
a second port configured to be connected to a second node; and
a first impedance component connected between the first port and the second port,
wherein the first node of the cable is in between the first end and the second end of the cable.

24. The termination circuit of claim 23, further comprising:
a capacitor connected between the first impedance component and the second port; and
a first switch connected between the first impedance component and one of the first port or the second port.

25. The termination circuit of claim 24, further comprising:
a logic circuit
connected to the first port,
configured to open the first switch in response to an indication that the signal producing circuit is or will be configured to produce a first type of signal, and
configured to close the first switch in response to an indication that the signal producing circuit is or will be configured to produce a second type of signal, wherein
the first type of signal represents information within a first range of amplitudes,
the second type of signal represents information within a second range of amplitudes, and
the first range of amplitudes is greater than the second range of amplitudes.

26. The termination circuit of claim 25, further comprising:
a third port configured to be connected to a third node of a second conductor of the cable;
a second impedance component connected between the third port and the second port;
a second switch connected between the second impedance component and one of the third port or the second port,
wherein the logic circuit
is connected to the third port,
is configured to open the second switch in response to the indication that the signal producing circuit is or will be configured to produce the first type of signal, and
is configured to close the second switch in response to the indication that the signal producing circuit is or will be configured to produce the second type of signal, and
wherein the third node is in between the first end and the second end of the cable.

27. The termination circuit of claim 26, further comprising:
a fourth port configured to be connected to a fourth node of a third conductor of the cable;
a third impedance component connected between the fourth port and the second port; and
a third switch connected between the third impedance component and one of the fourth port or the second port,
wherein the logic circuit
is connected to the fourth port,
is configured to open the third switch in response to the indication that the signal producing circuit is or will be configured to produce the first type of signal, and
is configured to close the third switch in response to the indication that the signal producing circuit is or will be configured to produce the second type of signal, and
wherein the fourth node is in between the first end and the second end of the cable.

28. An apparatus, comprising:
a signal producing circuit;
a display device having a first display driver integrated circuit (DDIC) and a second DDIC, at least one of
the first DDIC lacking a termination impedance component internal to the first DDIC to provide a line termination function for a serial interface with the signal producing circuit, or
the second DDIC lacking a termination impedance component internal to the second DDIC to provide the line termination function for the serial interface with the signal producing circuit;
a cable having
a first end of the cable connected to the signal producing circuit and
a second end of the cable connected to the first DDIC and to the second DDIC; and
a termination circuit having a first port, a second port, and an impedance component,
the first port connected to a first node of a conductor of the cable,
the second port connected to a second node, and
the impedance component connected between the first port and the second port,
wherein the termination circuit is formed as an integrated circuit mounted on the cable near the first node of the conductor, and
wherein the first node of the cable is in between the first end and the second end of the cable.

29. The apparatus of claim 28, wherein the termination circuit further comprises a switch and a logic circuit,
the switch connected between the impedance component and one of the first port or the second port, and
the logic circuit
connected to the first port,
configured to open the switch in response to an indication that the signal producing circuit is or will be configured to produce a first type of signal, and
configured to close the switch in response to an indication that the signal producing circuit is or will be configured to produce a second type of signal, wherein
the first type of signal represents information within a first range of amplitudes,
the second type of signal represents information within a second range of amplitudes, and the first range of amplitudes is greater than the second range of amplitudes.

30. The apparatus of claim 28,
wherein the first node of the conductor
- is located nearer to the second end of the cable than to the first end of the cable and
- is located near to a point at which the conductor divides into a first line and a second line, and wherein the first line is connected to the first DDIC and the second line is connected to the second DDIC.

* * * * *